United States Patent
Cortaire Apesteguia (10) Patent No.: US 11,879,442 B2
(45) Date of Patent: Jan. 23, 2024

(54) SEAL FOR A WIND TURBINE NACELLE

(71) Applicant: Siemens Gamesa Renewable Energy Innovation & Technology S.L., Sarriguren (ES)

(72) Inventor: Jorge Cortaire Apesteguia, Sarriguren (ES)

(73) Assignee: SIEMENS GAMESA RENEWABLE ENERGY INNOVATION & TECHNOLOGY S.L

( * ) Notice: Subject to any disclaimer, the term of this patent is extended or adjusted under 35 U.S.C. 154(b) by 93 days.

(21) Appl. No.: 17/176,892

(22) Filed: Feb. 16, 2021

(65) Prior Publication Data
US 2021/0262450 A1 Aug. 26, 2021

(30) Foreign Application Priority Data
Feb. 20, 2020 (EP) .................... 20380006

(51) Int. Cl.
*F03D 80/80* (2016.01)
*F03D 80/50* (2016.01)
*F16J 15/40* (2006.01)
*G05D 9/12* (2006.01)

(52) U.S. Cl.
CPC ............. *F03D 80/88* (2016.05); *F03D 80/50* (2016.05); *F16J 15/40* (2013.01); *G05D 9/12* (2013.01); *F05B 2240/57* (2013.01)

(58) Field of Classification Search
CPC .......... F03D 80/00; F03D 80/50; F03D 80/88; F05B 2240/57; F05B 2240/912; F16J 15/40
See application file for complete search history.

(56) References Cited

U.S. PATENT DOCUMENTS 9,689,376 B2* 6/2017 Booth .................. F03D 7/0248
2010/0032960 A1* 2/2010 Numajiri ............... F03D 80/00 290/55
2014/0301848 A1* 10/2014 Valero Lafuente .. F16J 15/3288 416/174

FOREIGN PATENT DOCUMENTS

CN 201747538 U 2/2011
CN 201786570 U 4/2011
(Continued)

OTHER PUBLICATIONS

CN106968898 English translation (Year: 2023).*
(Continued)

*Primary Examiner* — Woody A Lee, Jr.
*Assistant Examiner* — Cameron A Corday
(74) *Attorney, Agent, or Firm* — Schmeiser, Olsen & Watts LLP (57) ABSTRACT

Provided is a seal arranged about a tower aperture of a wind turbine nacelle, which seal includes an annular channel shaped to contain a liquid, and an annular lip extending downwards into the annular channel, which annular channel and annular lip are mounted at opposite sides of a gap between the nacelle and a wind turbine tower; and further including a volume of liquid in the annular channel, which liquid volume is sufficient to immerse the annular lip about its lower circumference to prevent a passage of air between nacelle interior and nacelle exterior. A seal maintenance arrangement including such a seal and a device for replenishing the liquid in the annular channel is also provided.

12 Claims, 5 Drawing Sheets

(56) References Cited

FOREIGN PATENT DOCUMENTS

| | | |
|---|---|---|
| CN | 106968898 A | 7/2017 |
| CN | 206845904 U | 1/2018 |

OTHER PUBLICATIONS

CN206845904 English translation (Year: 2023).*
European Search Report dated Aug. 14, 2020 for Application No. 20380006.5.

* cited by examiner

SEAL FOR A WIND TURBINE NACELLE

CROSS-REFERENCE TO RELATED APPLICATIONS

This application claims priority to EP Application No. 20380006.5, having a filing date of Feb. 20, 2020, the entire contents of which are hereby incorporated by reference.

FIELD OF TECHNOLOGY

The following relates to a seal for a tower aperture of a wind turbine nacelle.

BACKGROUND

Usually, a wind turbine comprises a nacelle mounted on top of a tower. The purpose of the nacelle is to protect the machinery and electronics of the wind turbine from exposure to the atmosphere. It is necessary to be able to yaw the nacelle relative to the tower, for example to turn the aerodynamic rotor of the wind turbine into the wind. This means that there is generally a gap between the nacelle and the tower. The gap must be sealed in some way in order to prevent pollutants such as grease or oil from escaping to the outside, and to prevent outside air—often carrying dust and/or corrosive moisture and salt—from entering the nacelle interior.

It can be difficult to provide such a tower/nacelle seal for several reasons. For example, the seal must allow free yaw movement of the nacelle in order to avoid damage to the yaw drive motors. Another problem is that there is great variation in tower and nacelle design, so that each wind turbine type generally requires a specific seal construction. Furthermore, the construction of large components such as nacelle and tower is associated with large tolerances, so that any tower/nacelle seal must allow for such tolerances.

One type of conventional tower/nacelle seal is constructed by arranging a flexible collar (also referred to as profile or apron) across the gap between tower and nacelle. For example, one edge of a rubber collar can be attached about the tower circumference, so that the other edge rests on an interior surface of the nacelle. The rubber collar acts to prevent the exchange of air between nacelle interior and exterior. However, a truly airtight seal is generally not possible using such a collar, since a pressure difference between outside and inside air may be enough to lift the collar, allowing outside air to enter the nacelle. Furthermore, frequent yawing motion of the nacelle means that the collar will be subject to friction and wear.

Another known type of seal uses an arrangement of dense brushes at the interface between tower and nacelle. However, it is generally not possible to achieve an airtight seal using brushes alone.

A further problem associated with these types of conventional tower/nacelle seal is that their location underneath the nacelle is generally difficult to access by service personnel, so that maintenance and repair of such seals may be hazardous and time-consuming. This means that any components of a convention seal that are exposed to the outside environment must be manufactured to withstand corrosion, especially for marine or coastal installation sites, thus adding to the overall cost of the seal.

SUMMARY

An aspect relates to provide a tower/nacelle seal for a wind turbine that overcomes the problems outlined above.

According to embodiments of the invention, the seal is arranged about a—usually circular—tower aperture of a wind turbine nacelle and comprises an annular channel shaped to contain a liquid and an annular lip extending from above into the annular channel, which annular channel and annular lip are mounted at opposite sides of a gap between the nacelle and a wind turbine tower; and a volume of liquid contained in the annular channel, which liquid volume is sufficient to immerse the annular lip about its entire circumference to prevent a passage of air between nacelle interior and nacelle exterior.

The inventive seal is cheap and simple when compared to the related art seals described above. Another advantage of the inventive seal is that it can easily adapt to constructional tolerances of tower and nacelle openings, since the lower edge of the annular lip will always remain immersed in the liquid. This simplifies the design and construction of the tower/nacelle interface region of a wind turbine. Another advantage is that the seal is entirely frictionless, i.e. it need not comprise any parts that are susceptible to wear or fatigue. Maintenance of the inventive seal is therefore very economical. Because it is frictionless, the inventive seal will not have any detrimental effect on the yaw system.

Since the inventive seal is very effective, offering an essentially air-tight seal between the nacelle interior and the nacelle exterior, the seal can significantly reduce the cost of air treatment, particularly in offshore wind turbines for which the air in the nacelle interior must be clean and dry to avoid corrosion by airborne salt and moisture. The inventive seal can preclude the need for expensive pressurization systems. The costs of heating/cooling systems can also be significantly reduced, since the airtight seal prevents excessively cold or hot air from entering the nacelle.

Because the inventive seal is very effective at protecting the interior environment from airborne contaminants, the lifetime of components such as machinery and electronics can be extended.

According to embodiments of the invention, the seal maintenance arrangement comprises an embodiment of the inventive seal; a liquid level sensor arranged to monitor the level of liquid in the annular channel; a liquid reservoir arranged to provide a supply of liquid to the annular channel of the seal; and a conveyor or a means of conveying liquid from the reservoir to the annular channel on the basis of the monitored level.

According to embodiments of the invention, a wind turbine is provided with an embodiment of the inventive seal, so that the passage of air is prevented between the nacelle interior and the outside environment. In this way, the machinery and electronics installed in the nacelle interior are protected from corrosion from airborne moisture and/or salt particles.

The annular channel may also be referred to as a tank or container. The annular channel may be assumed to be watertight. The annular channel may be constructed in any suitable manner. For example, the annular channel can be formed in the shape of a torus, with only a narrow slit about its uppermost surface accommodate a vertically descending annular lip. Such a construction can prevent liquid from evaporating or otherwise escaping from the annular channel.

However, in a more economical realisation of embodiments of the invention, the channel comprises side-walls and a base, and is open at the top to expose the upper surface of the liquid contained in the channel. In a particularly simple construction, the annular channel comprises vertical side walls and a horizontal base. The volume of liquid contained in this type of annular channel will have an essentially rectangular cross-section. An exemplary channel manufactured in this way could have a 10 cm wide base or floor, and side walls with a height of 15-20 cm. Of course, the open annular channel could have any appropriate shape, for example it may be essentially U-shaped or V-shaped. The annular lip is constructed to extend past the upper edges of the open annular channel so that lowermost rim of the annular lip touches—or almost touches—the base of the channel.

Depending on the viscosity of the liquid contained in the channel, this can become "choppy" or uneven owing to vibrations or oscillations of the nacelle. Therefore, in an embodiment of the invention, the seal is constructed with sufficiently high side walls, and filled with a sufficient quantity of liquid to ensure that at least a small fraction of the lip is always immersed in the liquid, even if the surface of the liquid is not always level.

The inventive seal can be assembled in a number of different ways. In one embodiment, the annular channel is mounted about the tower aperture of the nacelle. To cross the gap between tower and nacelle in this embodiment, the annular lip is mounted about the upper level of the tower.

In an alternative approach, the annular channel is mounted about the tower, for example at a suitable distance below the uppermost level of the tower. To cross the gap between tower and nacelle in this embodiment, the annular lip is mounted about the tower aperture of the nacelle in such a way that it can extend downwards into the open channel.

The solid components of the seal can be constructed from any suitable materials. In an embodiment of the invention, the annular channel is constructed from a fiber-reinforced material such as fiber reinforced plastic, for example glass-fiber reinforced plastic (GFRP). Often, a wind turbine nacelle is made from GFRP. Therefore, in a embodiment of the invention, the annular channel may be constructed as an integral part of the nacelle. For example, elements of the nacelle floor can be moulded to also include the annular channel. The annular channel can be formed so that its base is at the same level as the nacelle floor, for example, or so that its upper rims are at the same level as the nacelle floor, etc. When constructed in this way, the nacelle can be configured so that its floor or base is at a suitable level below the uppermost level of the tower, so that the annular lip can extend downwards into the liquid contained in the channel. Alternatively, the nacelle can be constructed to include a cylindrical sleeve extending from the circular tower aperture in the nacelle floor towards a suitable level below the uppermost level of the tower, so that the annular lip can extend downwards into the liquid contained in the channel.

Since the airtight aspect of the seal is ensured primarily by immersion of the lip in the liquid contained in the channel, there is no particular need for the seal to be made of a flexible material. For example, the annular lip could also be made of a lightweight and long-life material such as GFRP, sheet metal, etc. Alternatively, the annular lip could be cut to the required size from a sheet of flexible material such as rubber or plastic.

Of course, for the seal to be truly airtight, the annular lip must be connected to the tower or nacelle, depending on the seal design, in such a way to prevent the passage of air. In an embodiment in which the annular lip is mounted to the tower, it can be sufficient to clamp the mounting edge of the annular lip to the body of the tower, for example using a large hose clamp, Marman clamp, or similar.

In an embodiment in which the annular lip is mounted to the nacelle, a mounting surface of the annular lip may be glued in place. Alternatively, the annular lip may be attached using fasteners such as screws, bolts, staples or similar, and a sealant such as silicone may be applied along the mounting edge of the seal.

The liquid provided in the annular channel can be any suitable oil, low-density grease, water-glycol mixture, etc. The choice of liquid may depend on the prevailing conditions at the installation site, for example the expected extreme temperature, the expected humidity levels, the expected amount of airborne contaminants, etc.

As indicated above, an embodiment of the invention uses an annular channel in the form of a U-shaped tank or similar. In such an embodiment, the upper surface of the liquid in the contained is exposed to the nacelle environment. Therefore, to maintain the quality of the liquid, i.e. to prevent dust or oil droplets from accumulating in the liquid, it may be to provide a protective element shaped to cover the exposed upper opening of the annular channel.

The liquid in the annular channel may be chosen on the basis of a high enthalpy of vaporization, so that the liquid will not need to be frequently replenished. For example, an appropriate choice of oil can ensure that the channel remains filled above a desired level for several years.

Alternatively, it may be to automatically replenish the liquid level in the annular channel using an embodiment of the inventive seal maintenance arrangement. The liquid level sensor of the seal maintenance arrangement can be an optical sensor, an acoustic sensor, or any suitable kind of sensor that can detect whether the liquid level has dropped towards a minimum level. The sensor reading can be evaluated and used as a trigger to initiate a metering device or similar to dispense a quantity of liquid from the liquid reservoir. Such a fully-automated system may be for a wind turbine at a remote installation site, for example.

BRIEF DESCRIPTION

Some of the embodiments will be described in detail, with reference to the following figures, wherein like designations denote like members, wherein.

DETAILED DESCRIPTION

Figure 1:
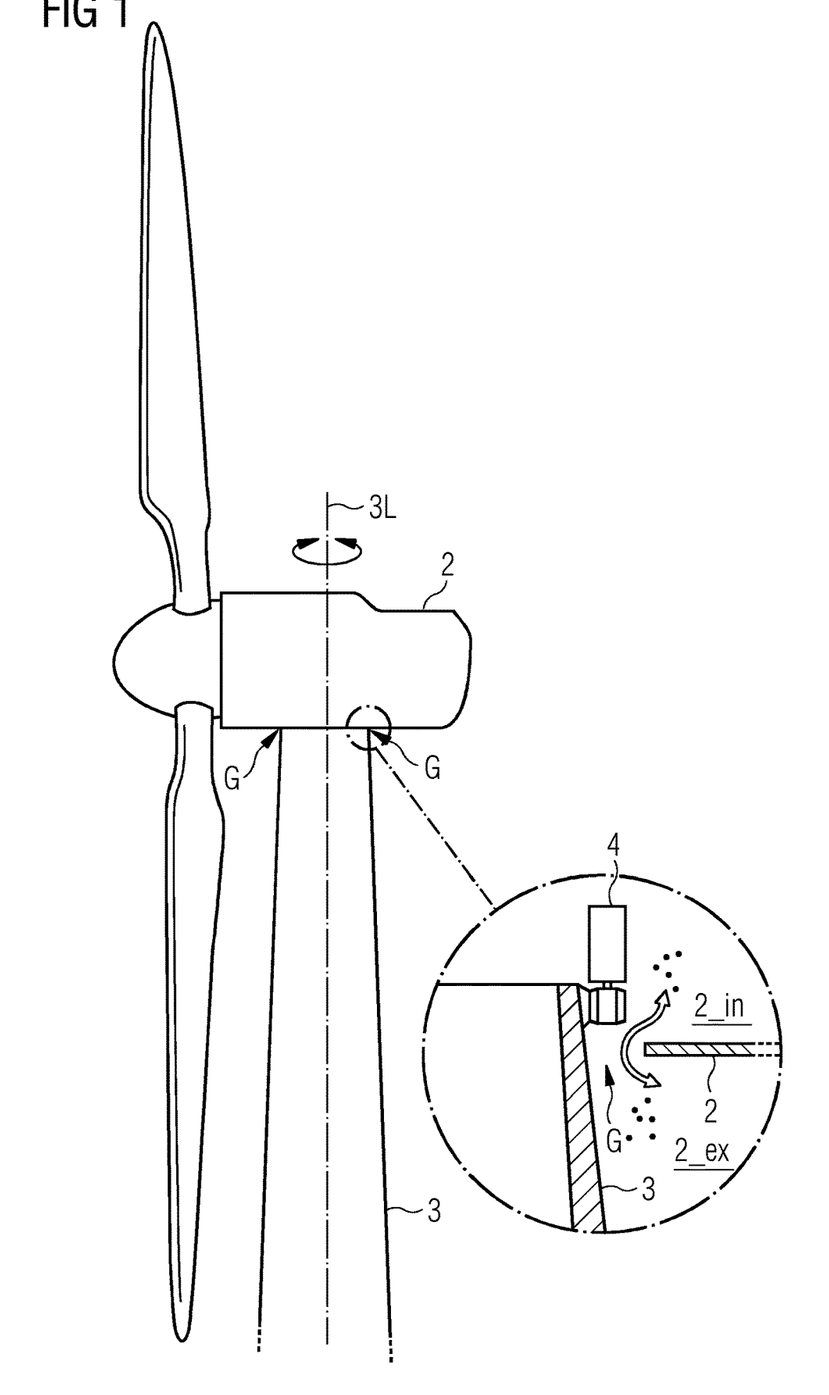
FIG. 1 shows a simplified cross-section through a region at the interface between a wind turbine tower and a nacelle.

FIG. 1 is a simplified drawing of a wind turbine and shows a nacelle 2 mounted on a tower 3, with an enlarged cross-section through a region at the interface between nacelle 2 and tower 3. The diagram indicates a yaw drive motor 4 that is part of the yaw system which turns the nacelle 2 about the longitudinal tower axis 3L as indicated by the arrow, in this case—as shown in a very simplified manner—by means of an outer toothed ring. To allow the nacelle to be turned, a gap G is necessary between nacelle 2 and tower 3. It is necessary to prevent exterior airborne contaminants such as salt or dust (indicated by dots in the enlargement), from entering the nacelle interior 2_in. Equally, it is necessary to prevent contaminants such as oil droplets from leaving the nacelle interior 2_in and reaching the exterior environment 2_ex on the outside of the nacelle 2. This exchange of air and contaminants is indicated by the double-ended arrow in the region of the gap G between tower 3 and nacelle 2. The inventive seal is presented as a solution to this problem, as will be explained in the following.

Figure 2:
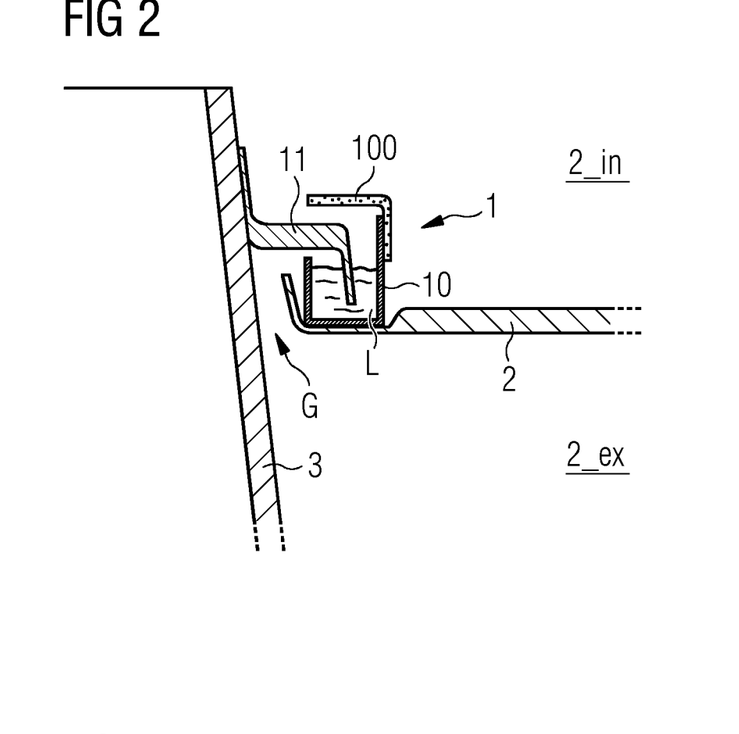
FIG. 2 shows an embodiment of the inventive tower/nacelle seal.
Figure 3:
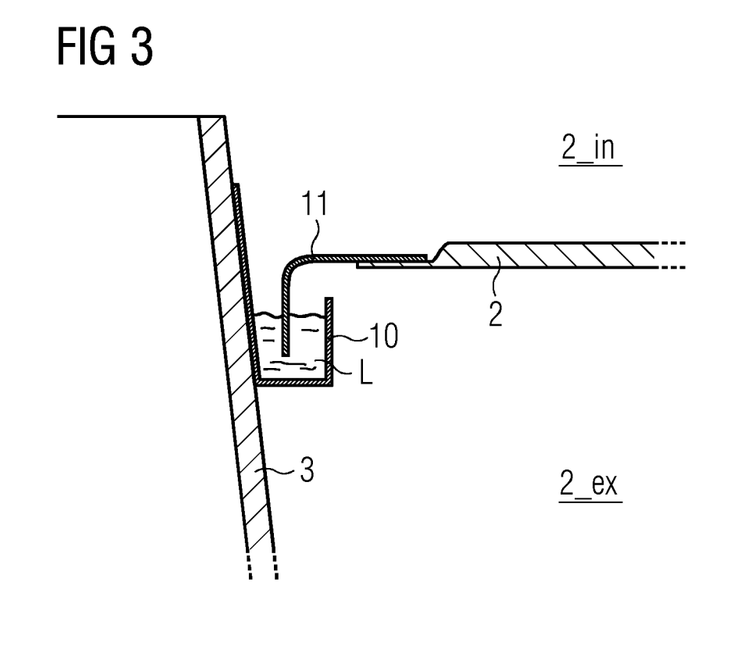
FIG. 3 shows another embodiment of the inventive tower/nacelle seal.

FIGS. 2-3 show embodiments of the inventive tower/nacelle seal 1. Only the relevant components are shown, but it shall be understood that the usual yaw system is in place near the top of the tower 3. In a first embodiment shown in FIG. 2, the seal 1 comprises an annular channel 10 mounted onto or formed as part of the nacelle 2, for example extending about the circular tower opening of the nacelle. An annular lip 11 or collar 11 is secured about the tower 3 and extends downwards into the channel 10. The channel 10 is filled to a suitable level with a liquid L, so that the lower edge 110 of the annular lip 11 is immersed in the liquid L. In this way, an essentially ring-shaped tank 10 of liquid L is installed at the interface between nacelle 2 and tower 3. The ring-shaped tank 10 is fixed to the nacelle 2 and turns with the nacelle 2, while the annular lip 11 is mounted to the tower 3 and remains stationary. This simple but effective seal 1 prevents outside air, airborne moisture and airborne contaminants from entering the nacelle interior 2_in. Equally, the seal 1 prevents the unwanted release of airborne contaminants to the nacelle exterior 2_ex. The diagram also shows a protective cover 100 arranged to prevent dirt from settling onto the surface of the liquid L.

In a second embodiment shown in FIG. 3, the seal 1 comprises a similar annular channel 10 and annular lip 11. However, in this embodiment, the annular lip 11 is mounted about the circular tower opening 20 of the nacelle 2, while the annular channel 10 is mounted about the outside surface at the upper end of the tower 3. The annular lip 11 is fixed to the nacelle 2 and turns with the nacelle 2, while the ring-shaped tank 10 is mounted to the tower 3 and remains stationary. The principle is the same, however, and the channel 10 is filled to a suitable level with a liquid L, so that the lower edge 110 of the annular lip 11 is immersed in the liquid L.

Figure 4:
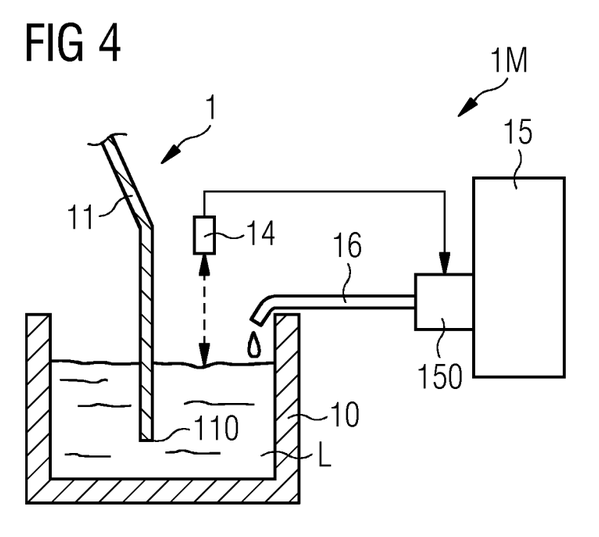
FIG. 4 shows an embodiment of the inventive seal maintenance arrangement.

FIG. 4 shows details of an embodiment of the inventive seal maintenance arrangement 1M. The seal 1 may be constructed in any suitable manner, for example as explained in FIG. 2 above, and only the relevant components are shown here. A level sensor 14 is set up to monitor the level of liquid in the annular channel 10. If the level drops toward a minimum, the liquid is replenished from a liquid reservoir 15. In this exemplary embodiment, a metering device 150 is provided to pump predefined quantities of liquid through a connecting hose 16 until the level sensor 14 reports a satisfactory level. In this way, it is ensured that the lower rim 110 of the lip 11 is always immersed in liquid L.

Figure 5:
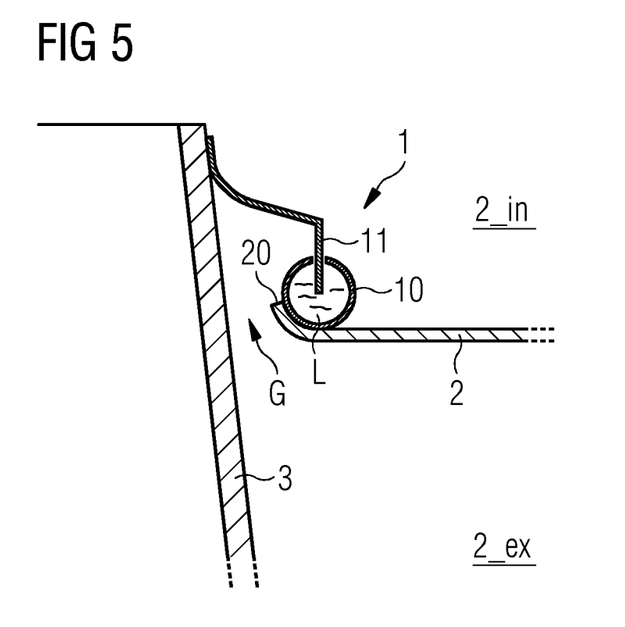
FIG. 5 shows a further embodiment of the inventive tower/nacelle seal.
Figure 6:
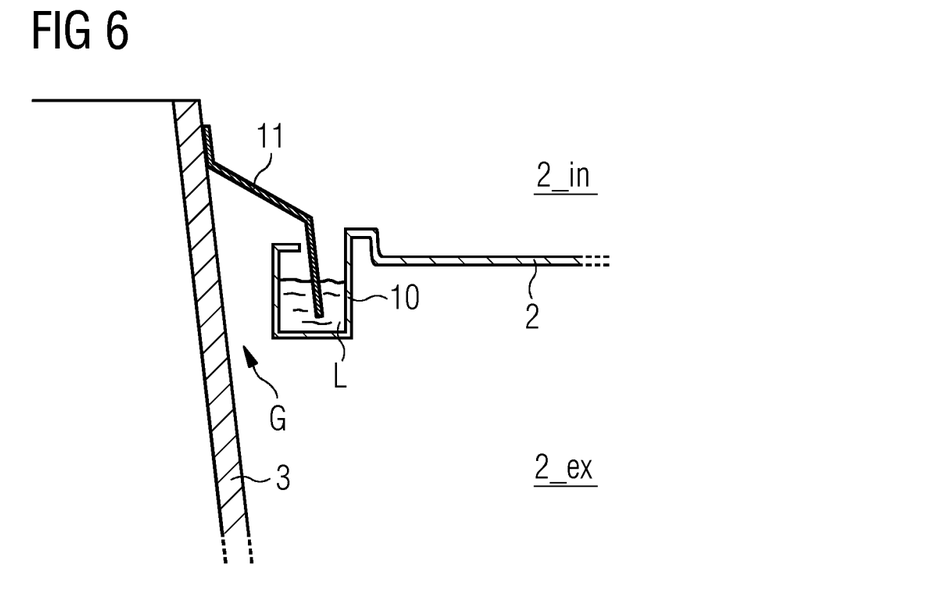
FIG. 6 show further embodiments of the inventive tower/nacelle seal.

FIG. 5 shows a further embodiment of the inventive tower/nacelle seal 1. Here, the annular channel 10 has a toroidal shape, with only a narrow slit to allow an annular lip 11 to extend into the interior of the channel 10. The toroidal channel 10 can be arranged at the circular rim 20 of the tower aperture of the nacelle 2. In this realisation, loss of liquid L is essentially prevented, so that the liquid level need rarely be replenished. FIG. 6 shows another embodiment of the inventive tower/nacelle seal 1. Here, the annular channel 10 is formed so that the liquid in the channel is below the level of the nacelle floor.

Figure 7:
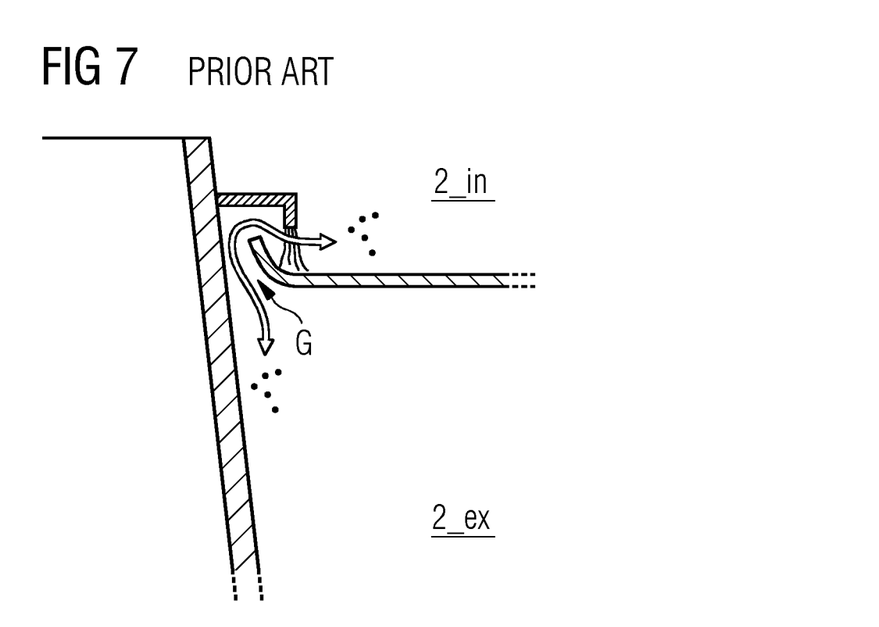
FIG. 7 shows a brush arrangement between the tower and the nacelle.
Figure 8:
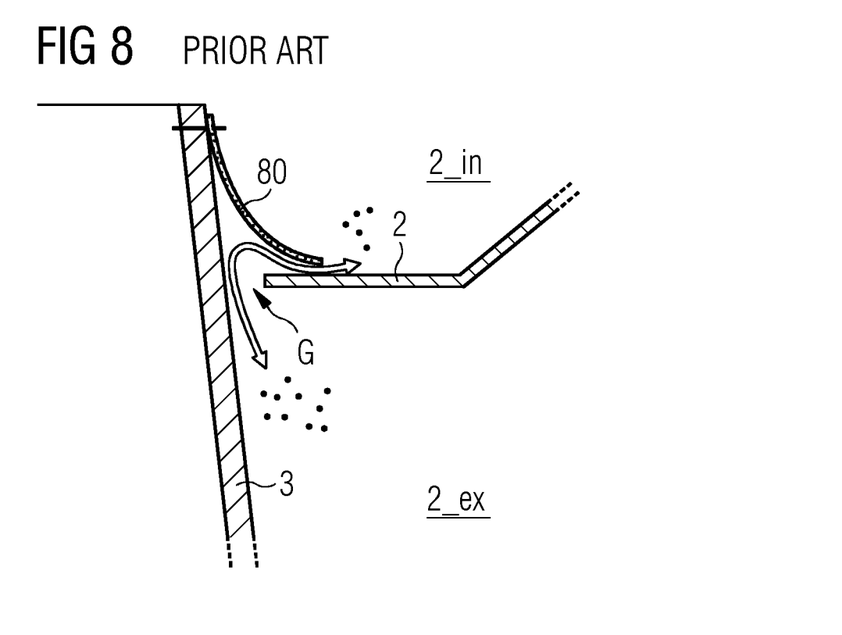
FIG. 8 shows related art tower/nacelle seals.

FIGS. 7 and 8 show related art tower/nacelle seals. FIG. 7 shows a brush arrangement 70 between the tower 3 and the nacelle 2. Because of the spaces between brush fibers, this related art approach cannot prevent the exchange of air and contaminants between nacelle interior 2_in and exterior 2_ex, and is also not very effective at keeping contaminants out of the nacelle interior 2_in. FIG. 8 shows a rubber collar 80 mounted about the tower upper rim and shaped to rest on the rim of the tower opening 20 of the nacelle 2. This solution is relatively economical but not very effective at preventing outside air and contaminants from entering the nacelle interior 2_in, because friction may wear down the rim of the rubber collar, or air pressure differences may raise the rim, allowing an exchange of air and contaminants.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A seal maintenance arrangement comprising:
   an annular channel;
   an annular lip extending downwards into the annular channel, wherein the annular channel and the annular lip are mounted at opposite sides of a gap between a nacelle and a wind turbine tower;
   a liquid level sensor arranged to monitor a level of liquid in the annular channel;
   a liquid reservoir arranged to provide a supply of liquid to the annular channel; and
   a conveyor for conveying liquid from the reservoir to the annular channel on the basis of a sensor output.

2. The seal maintenance arrangement according to claim 1, wherein the annular channel is mounted about a tower aperture of a nacelle.

3. The seal maintenance arrangement according to claim 2, wherein the annular lip is mounted about an upper level of a tower.

4. The seal maintenance arrangement according to claim 1, wherein the annular channel is mounted about a tower.

5. The seal maintenance arrangement according to claim 4, wherein the annular lip is mounted about a tower aperture of a nacelle.

6. The seal maintenance arrangement according to claim 1, wherein the annular channel is constructed from a fiber-reinforced material.

7. The seal maintenance arrangement according to claim 1, wherein the annular lip is made of a flexible material.

8. The seal according to claim 1, wherein the liquid comprises any of an oil, a low-density grease, or a water-glycol mixture.

9. A wind turbine comprising:
   a tower,
   a nacelle having a tower aperture, and
   a seal maintenance arrangement arranged about the tower aperture of the nacelle, wherein the seal maintenance arrangement comprises an annular channel and an annular lip extending downwards into the annular channel, wherein the annular channel and the annular lip are mounted at opposite sides of a gap between the nacelle and the tower, a liquid level sensor arranged to monitor a level of liquid in the annular channel, a liquid reservoir arranged to provide a supply of liquid to the annular channel, and a conveyor for conveying liquid from the reservoir to the annular channel on the basis of a sensor output.

10. The wind turbine according to claim 9, wherein the annular channel is constructed from a fiber-reinforced material.

11. The wind turbine according to claim 9, wherein the annular lip is made of a flexible material.

12. The wind turbine according to claim 9, wherein the liquid comprises any of an oil, a low-density grease, or a water-glycol mixture.

* * * * *